United States Patent

Gabrielle et al.

Patent Number: 6,154,147
Date of Patent: Nov. 28, 2000

[54] MESSAGE PROCESSING IN TWO-WAY DATA DEVICES

[75] Inventors: Paula C. Gabrielle, Fort Lauderdale; Karen S. Robertson, Boca Raton; Carlos Sanchez, Boynton Beach, all of Fla.

[73] Assignee: Motorola, Inc., Schaumburg, Ill.

[21] Appl. No.: 08/954,236

[22] Filed: Oct. 20, 1997

Related U.S. Application Data

[63] Continuation of application No. 08/556,738, Nov. 7, 1995, abandoned.

[51] Int. Cl.[7] ............................................. G08B 5/22
[52] U.S. Cl. ............................. 340/825.44; 455/38.1; 455/38.2; 371/69.1
[58] Field of Search ...................... 340/825.44; 455/38.1, 455/38.2; 371/69.1

[56] References Cited

U.S. PATENT DOCUMENTS

| | | | |
|---|---|---|---|
| 4,383,257 | 5/1983 | Giallanza | 340/825.44 |
| 4,704,608 | 11/1987 | Sato | 340/825.44 |
| 4,835,777 | 5/1989 | DeLuca et al. | 340/825.44 |
| 4,956,641 | 9/1990 | Matai | 340/825.44 |
| 5,173,688 | 12/1992 | DeLuca et al. | 340/825.44 |
| 5,384,565 | 1/1995 | Cannon | 340/825.44 |
| 5,436,620 | 7/1995 | Ide | 340/825.44 |

*Primary Examiner*—Brian Zimmerman
*Attorney, Agent, or Firm*—James A. Lamb

[57] ABSTRACT

In a technique for reducing duplicate messages in a two way data device, a determination (30) is made as to whether a first signature of a new message is the same as a second signature of a matching message. An error check is performed (50) on the new message when the first and second signatures are the same. A first response flag of the new message and a second response flag of the matching message are compared (40) when the first and second signatures are not the same. When the first and second response flags are both enabled, the new message is stored (20). Otherwise the error check is performed (50) on the new message. Select portions of the new message and matching message are stored (70, 80, 100, 110) in place of the matching message, depending on the comparison of the first and second response flags and the error check.

10 Claims, 2 Drawing Sheets

MESSAGE PROCESSING IN TWO-WAY DATA DEVICES

This is a continuation of application Ser. No. 08/556,738, filed Nov. 7, 1995 and now abandoned.

FIELD OF THE INVENTION

This invention relates generally to a method for improving memory usage in a message transceiver and more particularly to a method for processing duplicate messages which improves message accuracy and response characteristics in a two-way data device. This invention also relates to a two-way paging device which utilizes the improved method for processing duplicate messages.

BACKGROUND OF THE INVENTION

Pager service providers transmit messages through radio communication centers (RCC's) to selective call receivers within a specified geographic calling area. Generally, the service providers maintain transmitters at various locations throughout the calling area to insure that messages are effectively transmitted and received by a selective call receiver anywhere in the area. However, each of the various transmitters do not transmit the message at exactly the same time. As a result, an identical or "duplicate" message may be received by the selective call receiver only moments after an original message is received. The duplicate message can become an annoyance and in certain instances can confuse service subscribers. Therefore, in order to eliminate duplicate messages, one-way selective call receivers incorporate a sequential lockout which deletes duplicate messages that are received within a pre-specified time period. As a result, subscribers are not alerted to duplicate messages and thus the annoyance and confusion is eliminated.

Certain RCC's also provide two-way service for subscribers that possess two-way pagers. In addition to receiving messages, two-way pagers are able to respond to received messages when a response enable flag is transmitted with a message. In particular, when a response is enabled, two-way pager users can respond to the received message with a response that is selected by the user from a set of responses or with one of a preprogrammed set of responses.

The ability to respond necessitates message tracking in the pager software such that both the pager and the paging system can identify which message is being responded to. Accordingly, a unique tracking identifier ("signature") is transmitted with each message. Generally, identical messages with different tracking identifiers correspond to messages sent by different sources who are both expecting a reply to their page. However, since the number of possible tracking identifiers is finite, tracking identifiers wrap and repeat. This permits a situation where both a message and tracking identifier may be identical to that of an existing message and the source is not the same person. In this situation, if duplicate messages were distinguished solely on the basis of the message content and the tracking identifier, the sequential lockout method would delete the new message which in turn would disable the subscriber's ability to respond to the new page if a response were enabled for the new page. Even though the message and tracking identifier are identical the response flag could be enabled on the new message but disabled on the original. Accordingly, if the new message is deleted so would the ability to respond. On the other hand, storing an entire duplicate message in a two-way pager's memory in order to maintain the ability to respond takes up valuable memory space and is generally an inefficient means for processing duplicate messages. Therefore, there is a present need for an improved method for processing duplicate messages that maintains the optimum ability to respond to both original and duplicate messages and saves message memory in a two-way paging device by deleting select portions of original and duplicate messages.

SUMMARY OF THE INVENTION

This invention solves the problems of the prior art by the provision of a new method for processing duplicate messages that in certain instances retains the ability to respond to both original and duplicate messages, saves message memory and reduces message data error in a two-way paging device by not storing select portions (e.g., message data and response flags) of original and duplicate messages. In general, when a new message is received that comprises identical data and an identical tracking identifier, the new message is considered a duplicate of an existing message. In contrast, when the new message does not contain data identical to that of any existing message or when the signatures do not match, the new message is not considered a duplicate and both the new and old messages are stored in memory. Accordingly, in the case where an individual receives identical messages from more than one source, the individual can respond differently to the identical messages.

Another aspect of the present invention is its ability to utilize message memory more efficiently. Generally, when a duplicate message is received it is checked to determine if the data portion of the message contains errors. When the data portion of the new/duplicate message fails the error check, the data portion of the old message is kept and the data portion of the new message is deleted. Alternately, when the data portion of the new/duplicate message passes the error check, the data portion of the old message is replaced with the data portion of the new/duplicate message. As a result, message memory is utilized more efficiently as duplicate data is not repetitively stored therein.

Yet another aspect of the present invention is its ability to retain the response ability associated with old data messages that have been replaced with new/duplicate message data where a response flag is not enabled in the new/duplicate message. Alternately, the present invention is able to retain the response ability associated with a new/duplicate message when the response ability is enabled for both messages or only the new/duplicate message and the data portion of the old/existing message is kept over the data portion of the new/duplicate message.

The present invention is also directed toward a two-way data device which incorporates the above-mentioned duplicate message processing of the present invention.

DESCRIPTION OF THE PREFERRED EMBODIMENT

Figure 1:
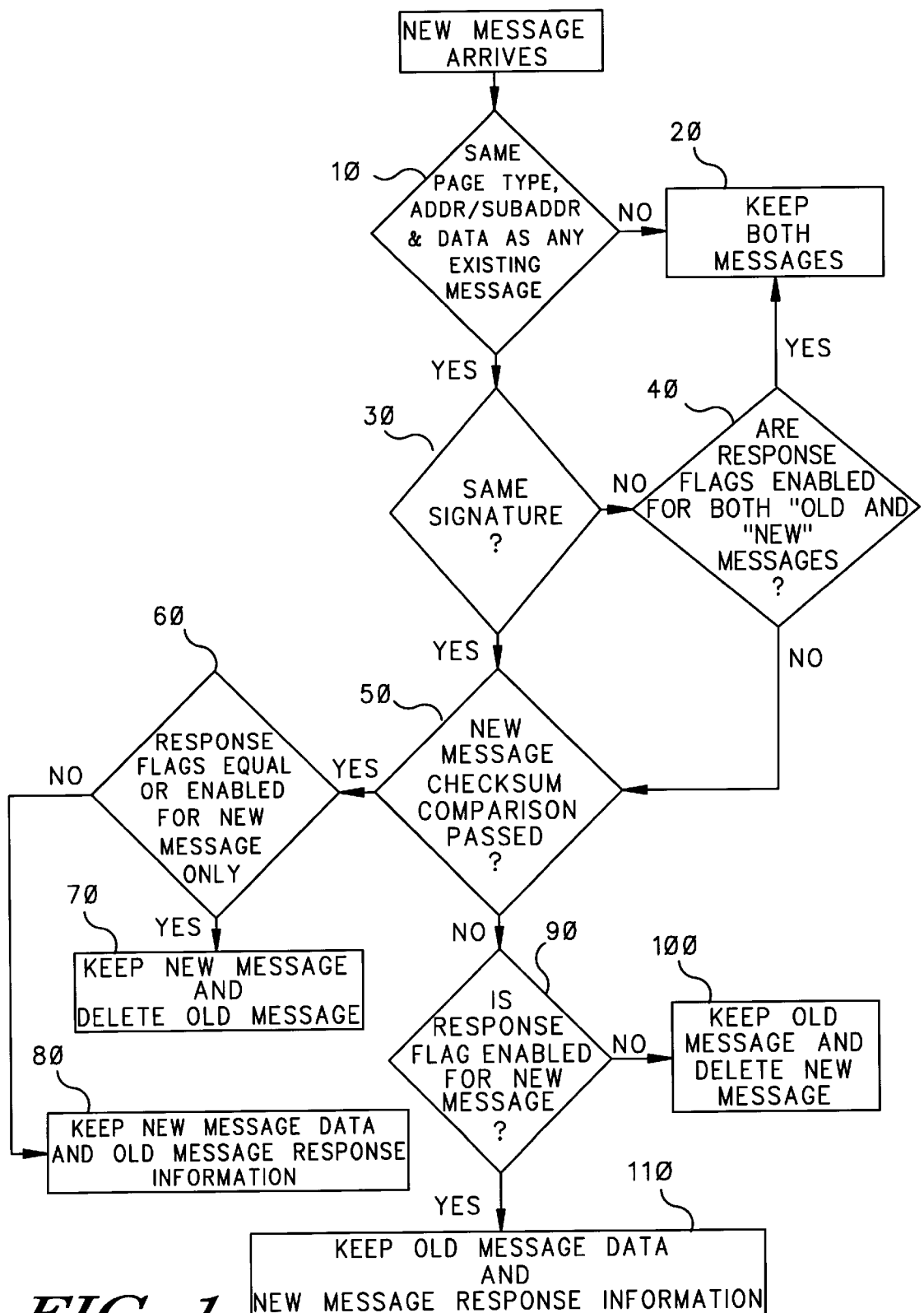
FIG. 1 is a flow diagram of the method for receiving a message in accordance with the preferred embodiment of the present invention.

With reference to FIG. 1 there is depicted a new method for processing duplicate messages that improves the accuracy of received messages and the response characteristics associated with messages in two-way paging devices. Each received message comprises a header, a signature, response flags, and message data. The header comprises a page type, an address, and a sub-address. The response flags comprise a response enabled flag which indicates whether or not a user response is enabled for the message, and a response data flag, which indicates whether or not a set of response data is included within the message data.

The first step 10 of the present invention consists of a comparison between certain message data and header information contained within a new message and the message data and header information of all existing messages stored within a two-way pager's message memory. Specifically, the page type, address, sub-address, and message data of all existing messages are compared to the new message to determine if there are any matches. Page type is meant to define whether the message is hex/binary, numeric or alphanumeric whereas address and sub-address information identifies a specific source of the new message selected from all the sources the receiver is configured to receive information from. For example, the address can be a particular information source such as a sports news source and the subaddress can be a particular baseball team. Alternatively, the address is a unique identifier of the selective call receiver. The unique address is used in situations in which a message is intended for reception based on the identity of a selective call receiver, as opposed to the source. The message data typically includes alphanumeric information, and can additionally include the set of responses from which a user can select a response when responses are enabled by the response enable flag.

When no match is found, the new message is determined to not be a duplicate of any existing message and both messages are stored in step 20. On the other hand, when a match occurs in step 10, a signature of the new message is compared with a signature of the matching old messages in step 30. Signatures are message tracking identifiers included with the message as transmitted by the RCC. As mentioned earlier, signatures are particularly useful in two-way pagers as a means for tracking response information corresponding to messages sent by the RCC. However, there are only a finite number of possible signatures and therefore they repeat after all combinations have been used. Therefore, it is possible to have a new message that comprises both identical message data and an identical signature as an existing message which is not a duplicate of the existing message. For example, pagers can be linked to voice-mail systems such that a message is sent to a subscriber whenever they receive a voice-mail message. In many cases the message data may be a standard code such as "3999" which is understood by the subscriber that a voice-mail message has been sent to them. The fact that the same message data is sent every time a voice-mail message is sent increases the possibility that a new message may contain the same tracking identifier or "signature" as an existing message stored in the pager's memory even though the new message has been sent in response to a new voice-mail and thus is not truly a duplicate of an old message. In this case it would be desirable to respond to the new message as opposed to responding to it as a duplicate message as is done in the prior art.

When in step 30 the signature of the new message is not the same as that of the old message found in step 10, the response flags for the new message and the old message are compared in step 40. When the response flags are enabled for both messages, both messages are stored in step 20 so that both can be responded to. Alternately, when at least one response enable flag is enabled in step 40, the process advances to step 50 as outlined below.

When the new message contains the same page type, address, subaddress and message data in step 10 and further contains the same signature in step 30 (also referred to as a new/duplicate message), or when the response enable flags of both or either the new/duplicate and old messages are not enabled in step 40, the new/duplicate message data is checked for errors in step 50. In the preferred embodiment, the checksum method of error detection is employed as is well known in the art. When the checksum test passes in step 50, the response enable flags of both the new and old messages are compared in step 60 and when the response enable flags are equal (i.e. both enabled or disabled) or when only the new message response enable flag is enabled, the new message data and new message response information is kept and the old message data and old message response information is deleted in step 70. However, when the response enable flags are not equal and the response enable flag for the new message is not enabled, the new message data and old message response information are stored in step 80. Message response information comprises the response flags, the response data indicator, an indicator of whether a response is in progress and a time stamp which indicates when a message has been received. The last two indicators are generated within the two-way pager.

When the checksum comparison does not pass in step 50, the response indicator flag for the new/duplicate message is checked in step 90. When the response flag for the new/duplicate message is disabled, the old message data and old message response information is kept and the new message and new message response information is deleted in step 100. Accordingly, the response ability for the old message has not been deleted. Alternately, when the response enable flags for the new/duplicate message are enabled in step 90, the old message data is stored along with the new message response information and the new message data and old message response information are deleted in step 110.

At each of steps 70, 80, 100, and 110, a duplication indicator associated with the message data is set. When the message data is displayed to the user, and the duplication indicator is set, an indication is displayed to the user that the message is a duplicate received message. The indication may be words, such as "duplicate message," or an icon. This added information is valuable, for example, for forewarning the user when he returns a phone call to an originator who has sent more than one message.

Ten different routes can be taken through the steps shown in FIG. 1, which describe 17 different cases depending on the page type, address, subaddress, data, signature, response enable flags and checksum of a new received message. The first eight cases arise when the page type, address, subaddress, data and signature of the new message are identical to an old message. Of the first eight, four cases arise when the checksum test is failed. In these cases, the old message data and the new message response information are kept whenever the new message response indicator flag is enabled, otherwise the old message data and response information are kept. In the other four cases, the checksum test is not errored and in three of these cases the new message data and response information are kept while the old message data and response information are deleted. However, in the fourth case when only the old message response enable flag is enabled, the new message data and old message response information are kept while the old message data and new message response information are deleted.

The second eight cases arise when the page type, address, subaddress, and data of the new message are identical to an old message but the signatures do not match. Of the second eight, four cases arise where the checksum test is failed. In two cases only the old message data and response information are kept. In a third case, when the response indicator flag is enabled for the new message only, the old message data is kept along with the new message response information while the old message response information and new message data are deleted. In the fourth case, when the response indicator flags are enabled for both the new and old messages, both messages' data and response information are kept. In three of the second four cases, where the checksum test is passed, the new message data and response information are kept. However, as before when the response enable flags for both messages are enabled, both messages' data and response information are kept.

Figure 2:
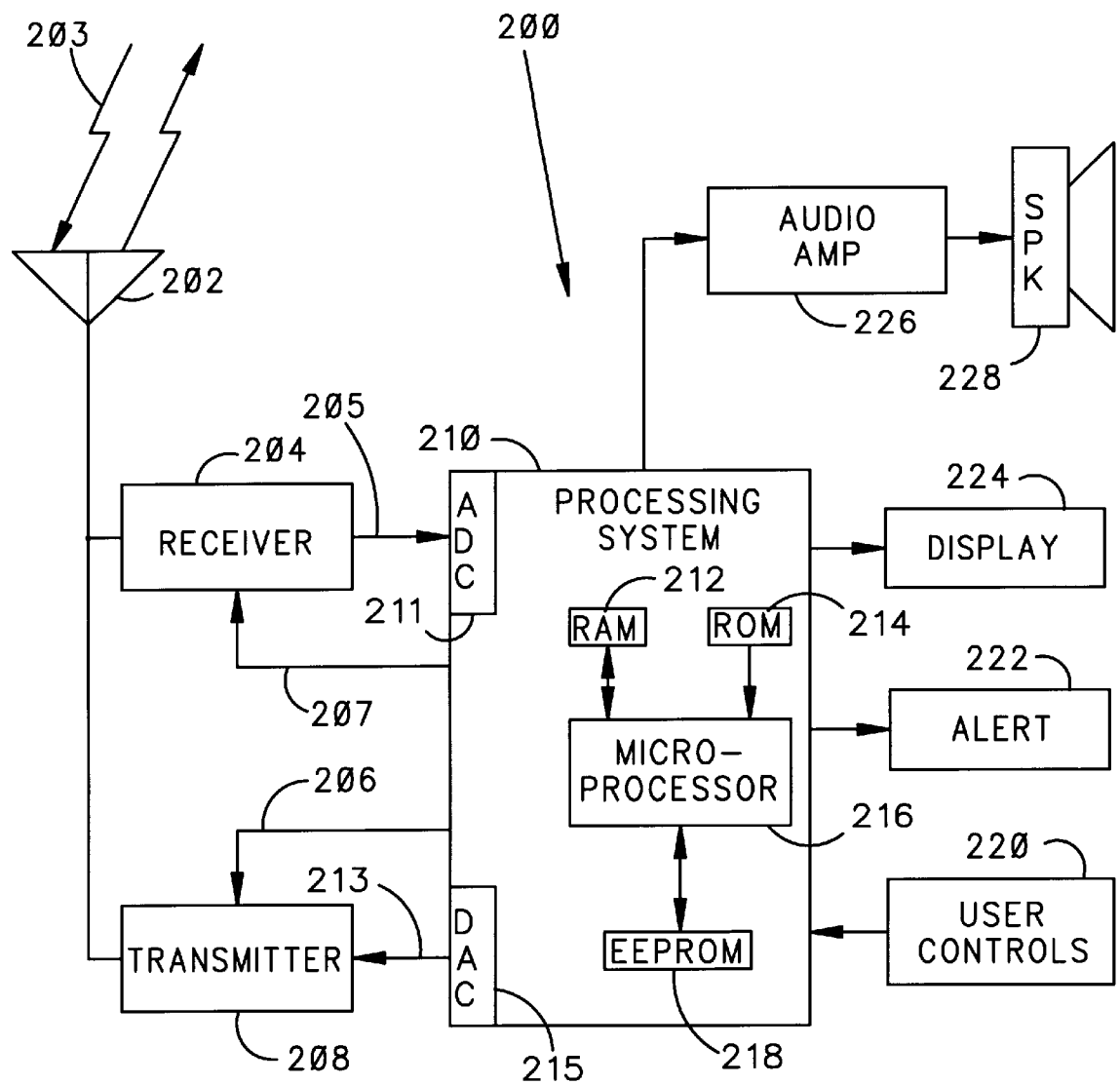
FIG. 2 is a block diagram of a two-way pager in accordance with the preferred embodiment of the present invention.

Referring to FIG. 2, an electrical block diagram of a multichannel selective call radio 200 is shown, in accordance with the preferred and alternative embodiments of the present invention. The selective call radio 200 includes an antenna 202 for intercepting and transmitting radio signals. The antenna 202 is coupled to a conventional receiver 204 wherein the intercepted signal 203 is received. Receiving includes filtering to remove undesirable energy at off channel frequencies, amplification of the filtered signal, frequency conversion of the signal 203, and demodulation of the signal 203 in a conventional manner. The receiver 204 thereby generates a demodulated signal through input 205 which is coupled to a processing section 210. The receiver 204 also has a power control input 207 coupled to the processing system 210. The processing system 210 is coupled to a display 224, an alert 222, an audio amplifier, 226, a transmitter 208, and a set of user controls 220. The transmitter 208 is coupled to the processing system 210 by a modulation signal output 213 and a channel control signal output 206, and is also coupled to the antenna 202. The audio amplifier 226 is coupled to a speaker 228. The processor section comprises a microprocessor which is coupled to an analog to digital converter (ADC) 211, a digital to analog converter (DAC) 215, a random access memory (RAM) 212, a read only memory (ROM 214, and an electrically erasable programmable read only memory (EEPROM) 218. The demodulated signal is coupled to the ADC 211. The processing system 210 is coupled to the transmitter by the DAC 215. The ADC 211 converts the demodulated signal from an analog signal to a digital signal in a conventional manner, for processing by the processing system 210. A message processor function decodes outbound words and processes an outbound message when an address received in the address field of the outbound signaling protocol matches an embedded address stored in the EEPROM 218, or when a global indication is received, in a manner well known to one of ordinary skill in the art for a selective call device. An outbound message which has been determined to be for the selective call radio 200 by the address matching or global indicator is processed by the message processor function according to the contents of the outbound message and according to modes set by manipulation of the set of user controls 220, in a conventional manner. An alert signal is typically generated when an outbound message includes user information. The alert signal is coupled to the alert device 222, which is typically either an audible or a silent alerting device.

When the outbound message includes alphanumeric or graphic information, the information is displayed on the display 224 in a conventional manner by a display function at a time determined by manipulation of the set of user controls 220. When the outbound message includes audio information which is voice, the message handling function converts the voice signal to an analog signal which is coupled to the speaker 228 through the audio amplifier 226, which amplifies the signal in a conventional manner. Inbound messages are generated in digital form by an inbound message function, typically in response to user manipulation of the set of controls 220 or an event detected by the processing system 210, such as receipt of an outbound message or occurrence of a predetermined time of day, in a conventional manner. An inbound message is generated and encoded using a standard protocol for the reverse (inbound) channel and coupled to the DAC 215, wherein it is converted to an analog signal which modulates the transmitter 208, in a manner well known to one of ordinary skill in the art. The conventional transmitter 208 generates an RF signal, which is transmitted by the antenna 202.

The RAM 212, the EEPROM 218, the ADC 211, and the DAC 215 are preferably conventional parts. The ROM 214 is a conventional part having a unique set of masked program instructions, a portion of which perform the unique functions which are described below. Preferably, the microprocessor 216 is similar to the DSP56100 digital signal processor (DSP) manufactured by Motorola, Inc. It will be appreciated that similar processors can be utilized for the microprocessor 216, and that additional processors of the same or alternate type can be added as required to handle the processing requirements of the processing system 210. It will be appreciated that other types of memory, e.g., ultra-violet erasable programmable read only memory (UVEPROM) or flash ROM, can be alternatively utilized for the ROM 214, as well as the RAM 212. It will be further appreciated that the RAM 212, the EEPROM 218, the ADC 211, the DAC 215, and the ROM 214, singly or in combination, can be integrated as a contiguous portion of the microprocessor 216.

Microprocessor 216 performs the improved duplicate message processing method of the present invention. In particular, after a message is received and decoded microprocessor 216 performs a comparison between, the page type, address, sub-address, and data of all existing messages with the new message to determine if there are any matches. When no match is found the new message is determined to not be a duplicate of any existing message and both messages are stored is in RAM 212 in step 20. On the other hand, when a match occurs in step 10, microprocessor 216 compares the signature of the new message with a signature of the matching old messages in step 30.

When the signature of the new message is not the same as that of the old message found in step 10 the response flags for the new message and the old message are compared by microprocessor 216 in step 40. When the response flags are enabled for both messages, microprocessor 216 stores both messages in RAM 712 in step 20 so that both can be responded to. Alternately, when one or both response indicator flags are not enabled in step 40, microprocessor 216 advances to step 50 as outlined below.

When the new message contains the same page type, address, subaddress and data and further contains the same signature, or when the response indicator flags of both or either the new/duplicate and old messages are not enabled microprocessor 216 checks the new/duplicate message for errors in step 50. In the preferred embodiment, the checksum method of error detection is employed as is well known in the art. When the checksum test passes in step 50 the response flags of both the new and old messages are compared in step 60 and when the flags are equal (i.e. both enabled or disabled) or when only the new message response indicator flag is enabled, microprocessor 216 stores the new message data and new message response information in RAM 212 and the old message data and old message response information is deleted as shown in step 70. However, when the response indicator flags are not equal and the response indicator flag for the new message is not enabled, microprocessor 216 stores the new message data and old message response information in step 80.

When the checksum comparison does not pass in step 50, microprocessor 216 checks the response indicator flag for the new/duplicate message in step 90. When the response flag for the new/duplicate message is disabled, microprocessor 216 stores the old message and old message response information in RAM 212 and the new message is deleted in step 100. Accordingly, the response ability for the old message has not been deleted. Alternately, when the response indicator flag for the new/duplicate message is enabled in step 90, microprocessor 216 stores the old message data along with the new message response information and the new message data and old message response information is deleted in step 110.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An improved method for processing messages in two-way data devices, said method comprising the following steps:
   (a) receiving a new message, said new message divided into portions comprising first header information, first data, a first signature and first response enable flag;
   (b) determining whether there exists a matching message, said matching message being a previously received message comprising second header information and a second data portion that matches said first header information and said first data portion of said new message, said matching message further divided into portions comprising a second signature and a second response enable flag;
   (c) storing said new message when no matching message exists in step (b);
   (d) determining whether said first signature of said new message is the same as the second signature of said matching message;
   (e) performing an error check on said new message when said first and said second signatures are the same;
   (f) comparing said first and second response enable flags when said first and second signatures are not the same in step (d), and when said first and second response enable flags are both enabled storing said new message, otherwise performing an error check on said new message;
   (g) storing neither, one, or both of the first data and the first response enable flag of said new message in place, respectively, of the corresponding second data and second response enable flag of said matching message depending on the status of each of said first and second response enable flags and said error check performed in step (e) or step (f).

2. The method according to claim 1, wherein the step of storing comprises the step of deleting the first data and the first response enable flag and keeping the second data and the second response enable flag when the error check fails and the first response enable flag is disabled.

3. The method according to claim 1, wherein the step of storing comprises the step of deleting the second data and the first response enable flag and keeping the first data and the second response enable flag when the error check passes and the first and second response enable flags are not equal and the response enable flag for the first message is disabled.

4. The method according to claim 1, wherein the step of storing comprises the step of deleting the first data and the second response enable flag and keeping the second data and the first response enable flag when the error check fails and the first response enable flag is enabled.

5. The method according to claim 1, wherein the step of storing comprises the step of deleting the second data and the second response enable flag and keeping the first data and the first response enable flag when the error check passes and the first and second response enable flags are both enabled or disabled or when the error check passes and the first response enable flag is enabled and the second response flag is disabled.

6. An improved two way data device comprising a receiver section, a transmitter section and a microprocessor, said receiver section receiving messages divided into portions comprising header information, a first data, a first signature and a response enable flag, said microprocessor performing the following steps in processing messages:
   (a) determining whether there exists a matching message, said matching message being a previously received message comprising second header information and a second data portion that matches said first header information and said first data portion of said new message, said matching message further divided into portions comprising a second signature and a second response enable flag;
   (b) storing said new message when no matching message exists in step (a);
   (c) determining whether said first signature of said new message is the same as the second signature of said matching message;
   (d) performing an error check on said new message when said first and said second signatures are the same;
   (e) comparing said first and second response enable flags when said first and second signatures are not the same in step (c) and when said first and second response enable flags are both enabled storing said new message otherwise performing an error check on said new message;
   (f) storing neither, one, or both of the first data and the first response enable flag of said new message in place, respectively, of the corresponding second data and second response flag of said matching message depending on the status of each of said first and second response flags and said error check performed in step (d) or step (e).

7. The method according to claim 6, wherein the step of storing comprises the step of deleting the first data and the first response enable flag and keeping the second data and the second response enable flag when the error check fails and the first response enable flag is disabled.

8. The method according to claim 6, wherein the step of storing comprises the step of deleting the second data and the first response enable flag and keeping the first data and the second response enable flag when the error check passes and the first and second response enable flags are not equal and the response enable flag for the first message is disabled.

9. The method according to claim 6, wherein the step of storing comprises the step of deleting the first data and the second response enable flag and keeping the second data and the first response enable flag when the error check fails and the first response enable flag is enabled.

10. The method according to claim 6, wherein the step of storing comprises the step of deleting the second data and the second response enable flag and keeping the first data and the first response enable flag when the error check passes and the first and second response enable flags are both enabled or disabled or when the error check passes and the first response enable flag is enabled and the second response flag is disabled.

\* \* \* \* \*